United States Patent
Vaidya

(10) Patent No.: US 8,201,462 B2
(45) Date of Patent: Jun. 19, 2012

(54) RECIRCULATION TYPE OSCILLATOR FLOW METER

(76) Inventor: Avinash Shrikrishna Vaidya, Maharashtra (IN)

(*) Notice: Subject to any disclaimer, the term of this patent is extended or adjusted under 35 U.S.C. 154(b) by 71 days.

(21) Appl. No.: 12/997,086

(22) PCT Filed: Apr. 29, 2009

(86) PCT No.: PCT/IN2009/000260
§ 371 (c)(1),
(2), (4) Date: Dec. 9, 2010

(87) PCT Pub. No.: WO2009/150664
PCT Pub. Date: Dec. 17, 2009

(65) Prior Publication Data
US 2011/0083516 A1    Apr. 14, 2011

(30) Foreign Application Priority Data
Jun. 10, 2008  (IN) .......................... 1232/MUM/2008

(51) Int. Cl.
*G01F 1/42* (2006.01)
(52) U.S. Cl. .................................. 73/861.61
(58) Field of Classification Search ............ 73/861.22, 73/861.19, 861.63, 202, 861.61
See application file for complete search history.

(56) References Cited

U.S. PATENT DOCUMENTS

| | | | |
|---|---|---|---|
| 3,902,367 A | 9/1975 | Grant | |
| 4,838,091 A | 6/1989 | Markland et al. | |
| 4,930,357 A * | 6/1990 | Thurston et al. | 73/861.19 |
| 5,127,173 A * | 7/1992 | Thurston et al. | 73/202 |
| 5,363,704 A | 11/1994 | Huang | |
| 5,922,970 A * | 7/1999 | Ohle | 73/861.22 |
| 5,983,943 A | 11/1999 | Parry et al. | |
| 6,321,790 B1 | 11/2001 | Carver et al. | |
| 6,351,999 B1 * | 3/2002 | Maul et al. | 73/861.22 |
| 6,606,915 B2 | 8/2003 | Vannuffelen | |
| 7,094,208 B2 | 8/2006 | Williams et al. | |
| 7,383,740 B2 | 6/2008 | Krasilchikov et al. | |
| 2003/0191407 A1 | 10/2003 | Williams et al. | |

FOREIGN PATENT DOCUMENTS

| | | |
|---|---|---|
| DE | 7733396 | 3/1978 |
| DE | 69821965 | 12/2004 |
| EP | 0381344 | 8/1990 |
| WO | 2006114592 | 11/2006 |
| WO | 2008110766 | 9/2008 |

* cited by examiner

*Primary Examiner* — Jewel V Thompson
(74) *Attorney, Agent, or Firm* — Cowan, Liebowitz & Latman, P.C.; Mark Montague, Esq.

(57) ABSTRACT

The present invention discloses a recirculation type hydrodynamic oscillator flow meter for measuring the flow of fluids such as gas, air, water and oil, flowing through a conduit. This flow meter gives very accurate measurements over a long period of time since piezoelectric sensors are employed. The principle of working of this hydrodynamic oscillator flow meter is the generation of a self induced jet where the frequency of oscillations of the fluid jet is proportional to the flow rate.

10 Claims, 8 Drawing Sheets

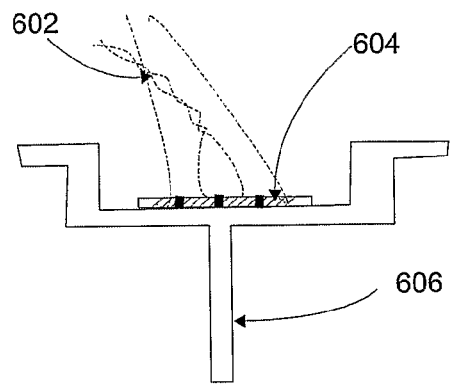
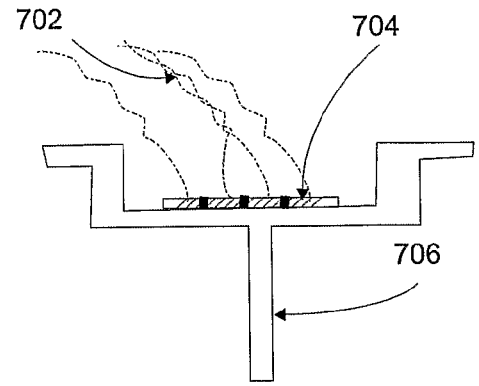
FIGURE 6A
FIGURE 7A
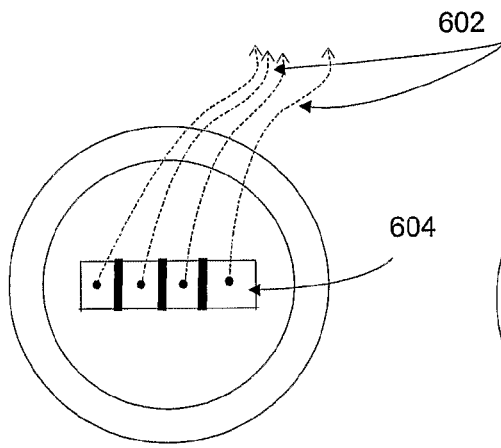
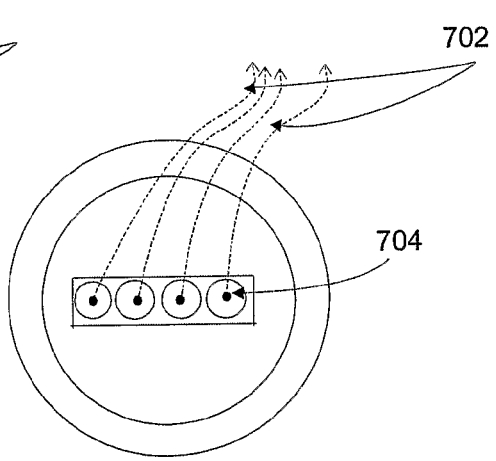
FIGURE 6B
FIGURE 7B

RECIRCULATION TYPE OSCILLATOR FLOW METER

FIELD OF THE INVENTION

This invention relates to flow measuring devices.

DEFINITIONS

Various expressions used in this specification will have the meanings as assigned to them as given below.

The expression "flow profile" used in the specification means the map or the plot of point velocities of fluid flow at precise different points across a section of a conduit through which the fluid is flowing. The theoretical velocities at different locations can be easily obtained by one skilled in the art using different mathematical models such as Bernoulli's theorem, Reynolds's equation, Prandtl's law and the like. A fully developed flow profile means a flow profile where the velocity of flow at a predetermined point can be predicted.

In accordance with this specification, an arrangement of one or more elements by which a pre determined flow profile is obtained is called a 'flow conditioner'. In accordance with this specification, the term 'nozzle' means an arrangement of one or more elements by which the cross section of a flow path is reduced. The expression 'bluff body' means any obstruction made of a variety of materials and shapes, geometric and non geometric, and may include a partition in a flow path.

BACKGROUND OF THE INVENTION

Different types of flow measuring devices based on the principle of generating oscillating jet are known. These type flow meters generate frequency signals proportional to the flow of fluids. These recirculation type flow meters currently use sensors and sensing methods which are not very accurate and are affected by noise.

There are several methods of flow conditioning and devices available such as tube bundles, perforated plates or wire mesh screens acting as flow conditioners. Conditioners of simple straight pipe length may be sufficient. However, where space is a constraint and flow profile is disturbed, then there exists a need to have a compact flow conditioner suitable for rectangular nozzle flow forming a jet.

U.S. Pat. Nos. 3,902,367 and 4,838,091 disclose flow meters wherein the flow rate is determined by measuring the amplitude and frequency of the oscillations. Hence, these flow meters are not very accurate.

U.S. Pat. No. 7,383,740 discloses a spirometer. The spirometer uses pressure and velocity sensors to detect the flow rater of the fluid. This results in inaccuracies and errors as pressure and velocity do not indicate the exact flow rate.

PCT application WO2006114592 describes a flow meter provided with means to apply magnetic field and electrodes. This makes the flow meter complicated and also prone to errors.

U.S. Pat. Nos. 5,983,943 and 6,321,790 disclose flow meters using pressure sensors or differential pressure sensors for determining the fluid flow rate.

U.S. Pat. No. 6,606,915 discloses a flow meter, using temperature sensitive elements as sensors. The change in resistance of a heated sensor is used to detect frequency of oscillations according to the meter disclosed in this document.

U.S. Pat. No. 7,094,208 discloses a flow meter which determines the flow rate using thermistors or other such temperature sensitive elements as sensors.

PCT application 2008110766 describes a bi-directional flow meter. The measurement means typically used are inductive sensors, ultrasonic sensors or pressure sensors. The frequency of the output signal is proportional to the frequency of oscillations, which in turn is used to determine the flow rate of the fluid.

Following are the limitations of flow meters of the prior art:

When magnets are used for creating magnetic field for sensing oscillation frequency of fluid, the fluid must have certain electrical conductivity. Hence, the flow of oils and gases cannot be measured. If magnetic particles are present in the flowing fluid, the meter will immediately get clogged since the magnets used are very strong and the burr or magnetic material once attracted towards the magnet are impossible to be removed. In addition to that, the magnets are costly and the assembly of these flow meters is very difficult. Also, they have limited operating temperature range.

When temperature sensitive type sensors are used, these sensors are heated above the operating temperature of the fluid and the oscillatory flow is sensed by cooling and heating periodically. These sensors are very delicate and external power is required to heat up the sensor. To compensate for frequency response of the sensor to varying operating temperature and other fluid properties of the flowing fluid, it is necessary to have complicated electronic circuitry for proper and accurate sensing of fluid fluctuations. Thus these meters have a limited operating pressure and temperature range.

Flow meters based on differential pressure measurement are also used currently. Fluctuations in the differential pressure measured across the feedback path or main stream can be used to measure frequency of oscillatory flow. However, the sensing ports, tubes and the volume across the diaphragm of the sensor add to the hydraulic capacitance which actually increases the volume effectively and add to the delay in feedback sensing. Also, the actual signal is attenuated to a large extent. This type of sensor also needs external power for its operation. If the tubes and ports are kept very small to avoid these problems, then a very small particle in the flow can block the sensor ports. In the medical applications, where the sterility of the instrument is a very essential factor, this tubing and passages can pose serious threat since it is not possible for them to get cleaned thoroughly. Further, these flow meters also have limited operating pressure and temperature ranges.

Inductive sensors have also been used in flow meters. The inductive flow meters are very sensitive to noise and hence not very accurate. The arrangement of coils and movable core is similar to a probe commonly known as the L.V.D.T. probe. A set of coils is excited by an ac voltage signal and a movement of the core inside the coils generates an electrical signal in another set of coils. To sense the fluid's oscillatory frequency, the probe with sealing arrangement, having a diaphragm or oil filled bellows, is located in the flow meter. The diaphragm moves in response to the oscillating fluid pressure, wherein the core is connected to the diaphragm on the other side and thus the signal is sensed. These types of sensors perform poorly at low frequency and at high frequency due to mechanical inertia.

Therefore there is a need for a flow meter which is more accurate and insensitive to noise.

OBJECTS OF THE INVENTION

It is an object of the present invention to provide a device for measuring flow rate of all types of fluids such as gas, oil, water and air which is independent of the fluid properties.

Another object of the present invention is to provide a flow meter which is accurate.

Still one more object of the present invention is to provide a flow meter which is economical.

Yet another object of the present invention is to provide a flow meter which is simple in construction.

SUMMARY OF THE INVENTION

In accordance with the preferred embodiment of the present invention, there is provided a recirculation type hydrodynamic oscillator flow meter for measuring the flow of fluids such as gas, air, water and oil, flowing through a conduit, said flow meter comprising:

- a meter body having a passage for the flow of the fluid, said passage having an inlet and an outlet;
- a nozzle provided in the passage spaced apart from the inlet;
- optionally a flow conditioner provided between the inlet of the passage and the inlet of the nozzle;
- a sensing chamber formed in the body between the outlet of the nozzle and the outlet of the passage;
- a bluff body provided within said sensing chamber spaced apart from the outlet of the nozzle;
- an arcuate face provided to the bluff body facing the outlet of the nozzle, said arcuate face adapted to cause recirculation and diversion to the flow of fluid impinging on the arcuate face, on either side of the bluff body alternately; and
- at least one sensor assembly comprising a sensor body having at least two sensing segments, leads extending from said sensing segments to a metering device located outside said meter body and at least one sensor fin extending from said segments into said passage.

Preferably, said flow conditioning means is provided with a machined rough surface, with uniform machined irregularities or is molded with irregularities.

Typically, said irregularities provided to the flow conditioning means are in the form of uniform rough surfaces or surfaces with vertical notches or in the form of dimpled golf ball patterns.

Typically, the sensing segments are selected from a group consisting of sensing segments including piezoelectric sensing segments, piezoresistive sensing segments, capacitive sensing segments, optoelectric sensing segments, stress/strain responsive sensing segments, magnetostrictive sensing segments and pressure sensitive sensing segments.

Typically, the sensing segments are round, disc shaped or in the form of rectangular strips.

Typically, the sensor fins are selected from a group consisting of single fins, bifurcated fins, cylindrical fins, rectangular fins, tapered fins and a combination thereof.

Typically the sensor fins are fitted between the inlet of the passage and the inlet of the sensing chamber.

Typically the sensor fins are fitted inside the sensing chamber.

Typically the sensor fins are fitted at the ends of the bluff body and between the bluff body and the outlet of the passage.

Typically, the sensor assembly has noise cancellation arrangement.

BRIEF DESCRIPTION OF ACCOMPANYING DRAWINGS

The invention will now be described with the help of the accompanying drawings, in which.

Figure 4:
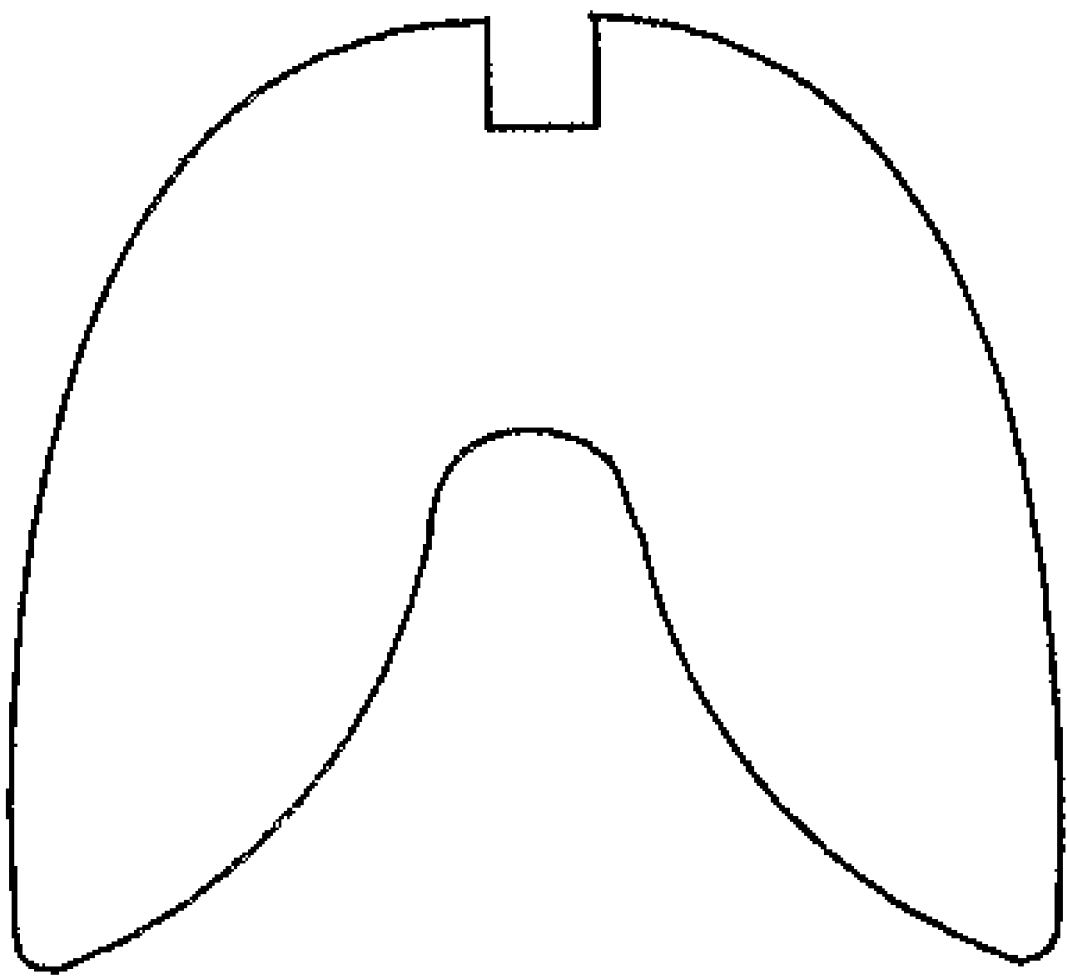
Figure 5A:
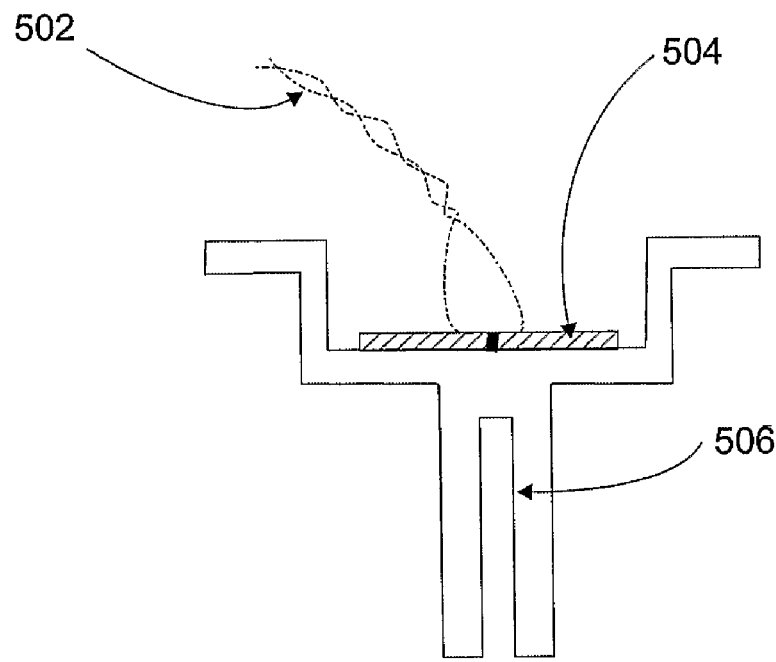
Figure 5B:
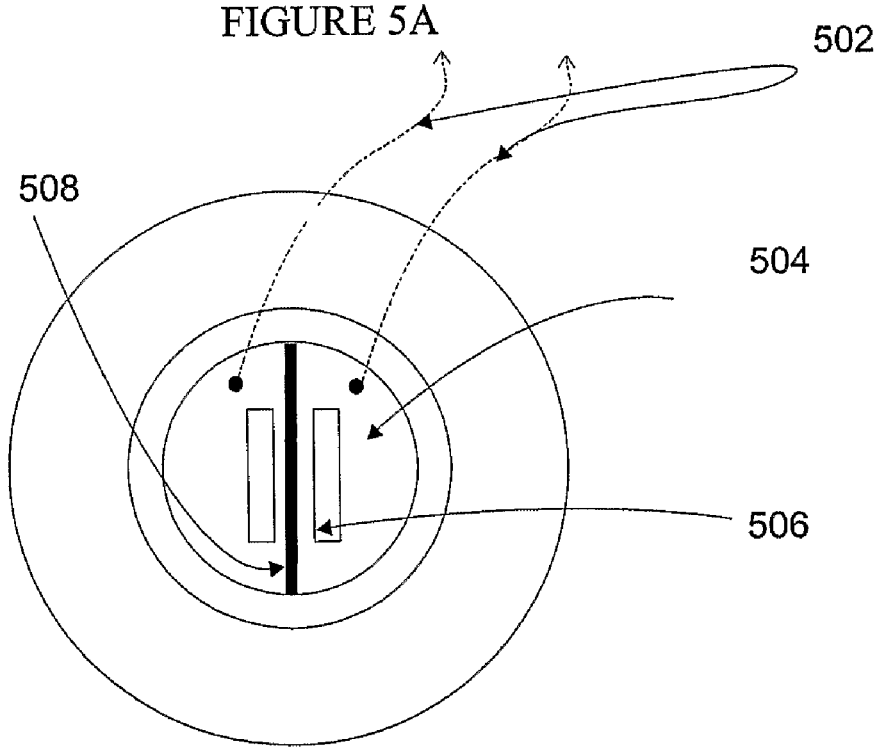
Figure 8A:
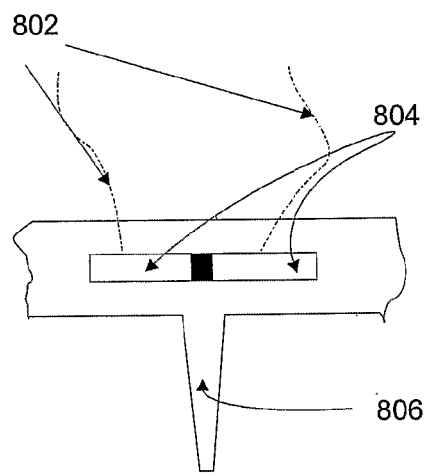
Figure 8B:
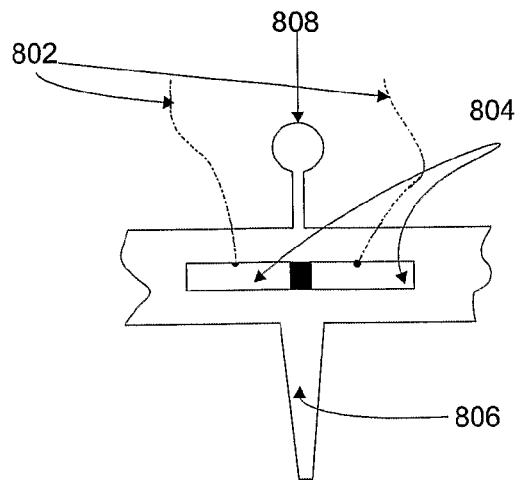
Figure 9:
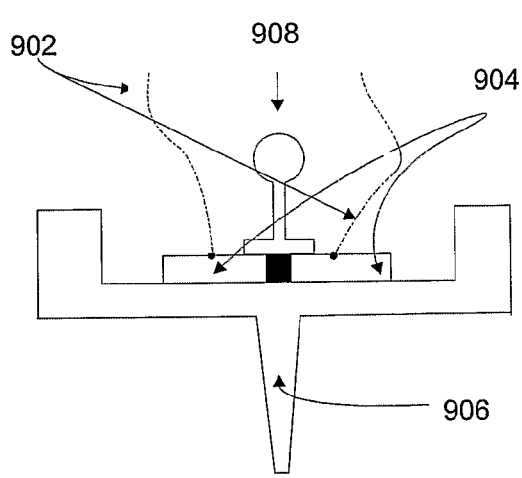
Figure 10:
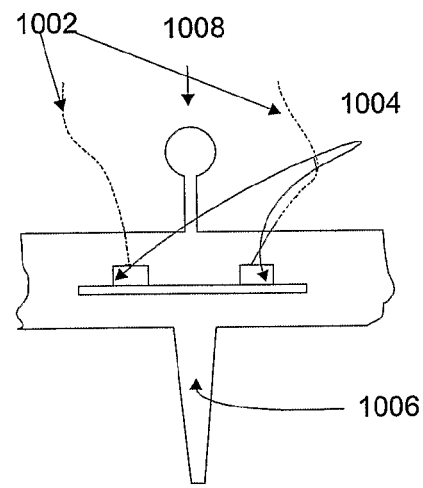

FIG. 3a-3d of the accompanying drawings illustrate different embodiments of the flow conditioner according to the present invention;

FIG. 4 of the accompanying drawings illustrates one embodiment of the bluff body in accordance with this invention;

FIG. 5a of the accompanying drawings illustrates the side view of the sensor assembly with a bifurcated fin for the flow meters according to the present invention;

FIG. 5b of the accompanying drawings illustrates the top view of the sensor assembly with a bifurcated fin shown in FIG. 5a;

FIG. 6a of the accompanying drawings illustrates the side view of the sensor assembly showing rectangular sensing segments according to the present invention;

FIG. 6b of the accompanying drawings illustrates the top view of the sensor assembly showing rectangular sensing segments shown in FIG. 6a;

FIG. 7a of the accompanying drawings illustrates the side view of the sensor assembly showing disc shaped sensing segments according to the present invention;

FIG. 7b of the accompanying drawings illustrates the top view of the sensor assembly showing disc shaped sensing segments shown in FIG. 7a;

FIG. 8a of the accompanying drawings illustrates one embodiment of the sensor assembly employed in a noise free environment in accordance with this invention;

FIG. 8b of the accompanying drawings illustrates one embodiment of the sensor assembly employed in a noisy environment in accordance with this invention;

FIG. 9 of the accompanying drawings illustrates another embodiment of the sensor assembly employed in a noisy environment in accordance with this invention; and FIG. 10 of the accompanying drawings illustrates one more embodiment of the sensor assembly employed in a noisy environment in accordance with this invention.

DETAILED DESCRIPTION OF ACCOMPANYING DRAWINGS

The drawings and the description thereto are merely illustrative of a flow meter in accordance with this invention and only exemplify the flow meter of the invention and in no way limit the scope thereof.

In accordance with the preferred embodiment of the present invention, there is provided a recirculation type hydrodynamic oscillator flow meter for measuring the flow of fluids such as gas, air, water and oil, flowing through a conduit. The principle of working of a hydrodynamic oscillator flow meter is the generation of a self induced jet where the frequency of oscillations of the fluid jet is proportional to the flow rate.

The flow meter comprises a meter body having a passage for the flow of the fluid, said passage having an inlet and an outlet, a nozzle provided in the passage spaced apart from the inlet, optionally a flow conditioner provided between the inlet of the passage and the inlet of the nozzle, a sensing chamber formed in the body between the outlet of the nozzle and the outlet of the passage, a bluff body provided within the sensing chamber spaced apart from the outlet of the nozzle, an arcuate face provided to the bluff body facing the outlet of the nozzle which is adapted to cause recirculation and diversion to the flow of fluid impinging on the arcuate face, on either side of the bluff body alternately; and at least one sensor assembly comprising a sensor body having at least two sensing segments, leads extending from the sensing segments to a metering device located outside the meter body and at least one sensor fin extending from the segments into the passage.

Figure 1:
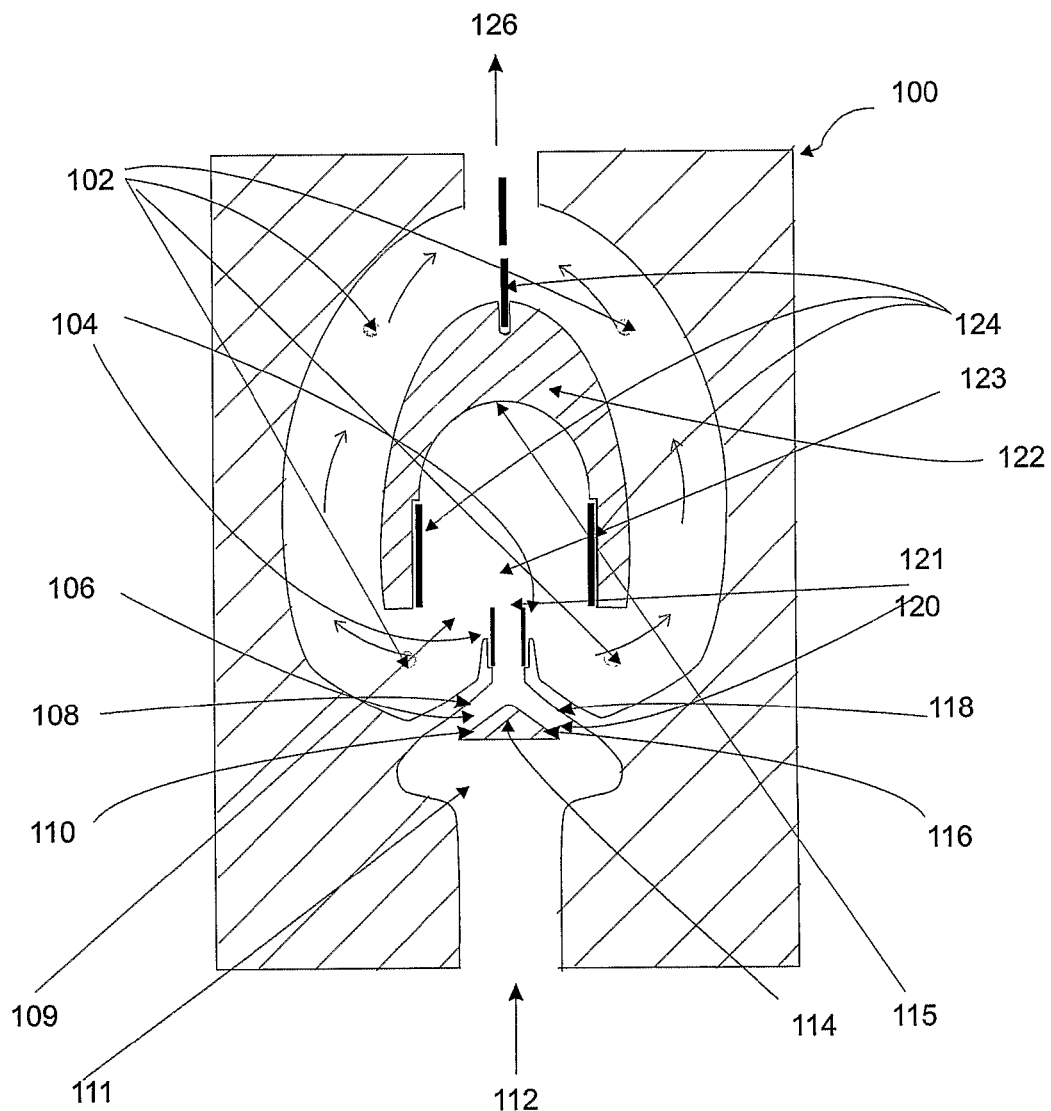
FIG. 1 illustrates an embodiment of the present invention, wherein the flow conditioning means has a diverging element.

FIG. 1 illustrates one embodiment of the present invention, wherein there is provided a recirculation type hydrodynamic oscillator flow meter. The flow meter comprises a meter body 100 having a passage 123. The meter body 100 may be formed by joining together two components by bolting or molding together as a single body. These components are not shown in the FIG. 1, but can easily be understood by one skilled in the art. These components may be made of materials including stainless steel, other metals, synthetic materials, polymers or any combination of the abovementioned materials.

The meter body 100 has an inlet 112 for allowing the fluid inflow. The body has a nozzle 121 provided in the passage 123 spaced apart from the inlet 112. A flow conditioning means 111 is provided proximate to the inlet 112 of the passage 123. A flow diverging element 114 can be provided in the flow conditioning means 111. When, the flow diverging element 114 is positioned, the incoming stream of the fluid is diverted into two.

The flow conditioning means 111 is provided with a machined rough surface, with uniform machined irregularities or is molded with irregularities. The irregularities provided to the flow conditioning means 111 are in the form of uniform rough surfaces or surfaces with vertical notches or in the form of dimpled golf ball patterns. The flow conditioning means 111 has 4 surfaces viz., surface 108, surface 118, surface 110 and surface 116 forming two channels viz., channel 106 and channel 120.

The irregularities on all the surfaces 108, 118, 110, 116 and the remaining sides and surfaces of the flow diverging element 114 break the boundary layer of the flowing fluid attached to the walls and form vortices or turbulent regions so that the fluid does not stagnate and does not alter the flow profile and effective nozzle width at different flow rates. The two channels 106 and 120 also introduce certain amount of uncertainty in the combined flow which is passed on towards the nozzle 121. This helps the jet which will be formed after leaving the nozzle 121 to get deflected easily.

A sensing chamber 109 is formed in the body 100 between the outlet of the nozzle 121 and the outlet 126 of the passage 123. A bluff body 122 is provided inside the sensing chamber 109 in the line of flow of the fluid, spaced apart from the outlet of the nozzle 121. The bluff body 122 has an arcuate face 115, facing the outlet of the nozzle 121. The arcuate face 115 is adapted to cause recirculation and diversion to the flow of fluid impinging on it, on either side of the bluff body 122 alternately, to either of the upstream paths in the sensing chamber 109, in accordance with the Coanda effect. The Coanda Effect is the tendency of a fluid jet to stay attached to an adjacent curved surface that is very well shaped. This action generates hydrodynamic fluidic oscillations and the frequency of these oscillations is directly proportional to the flow rate of the fluid.

At least one sensor fin, 102, 104 or 124 is provided in the passage 123. The sensor fin provided in the line of the flow of the fluid entering the meter body 100 through the inlet 112 through the flow conditioning means 111 is a bifurcated sensor fin 104. The bifurcated sensor fin 104 is thus located between the inlet of the passage 123 and the inlet of the sensing chamber 109. The bifurcated sensor fin 104 defines the nozzle 121 which forms a jet of the flowing fluid passing through it. The sensor fins can also be molded at the ends of the bluff body 122 or between the bluff body 122 and the outlet 126 of the passage 123, as represented by the reference numeral 124 of FIG. 1. Typically, the sensor fins employed at the abovementioned locations are single fins. Cylindrical fin sensors 102 can also be provided in the sensing chamber 109 as shown in FIG. 1. The sensor fins are part of sensor assemblies. In addition to the sensor fins, a sensor assembly has at least two sensing segments and leads extending from the sensing segments to a metering device located outside the meter body 100. The working of the sensor fin and sensor assembly is described in detail with respect to FIGS. 5a, 5b, 6a, 6b, 7a and 7b.

Figure 2:
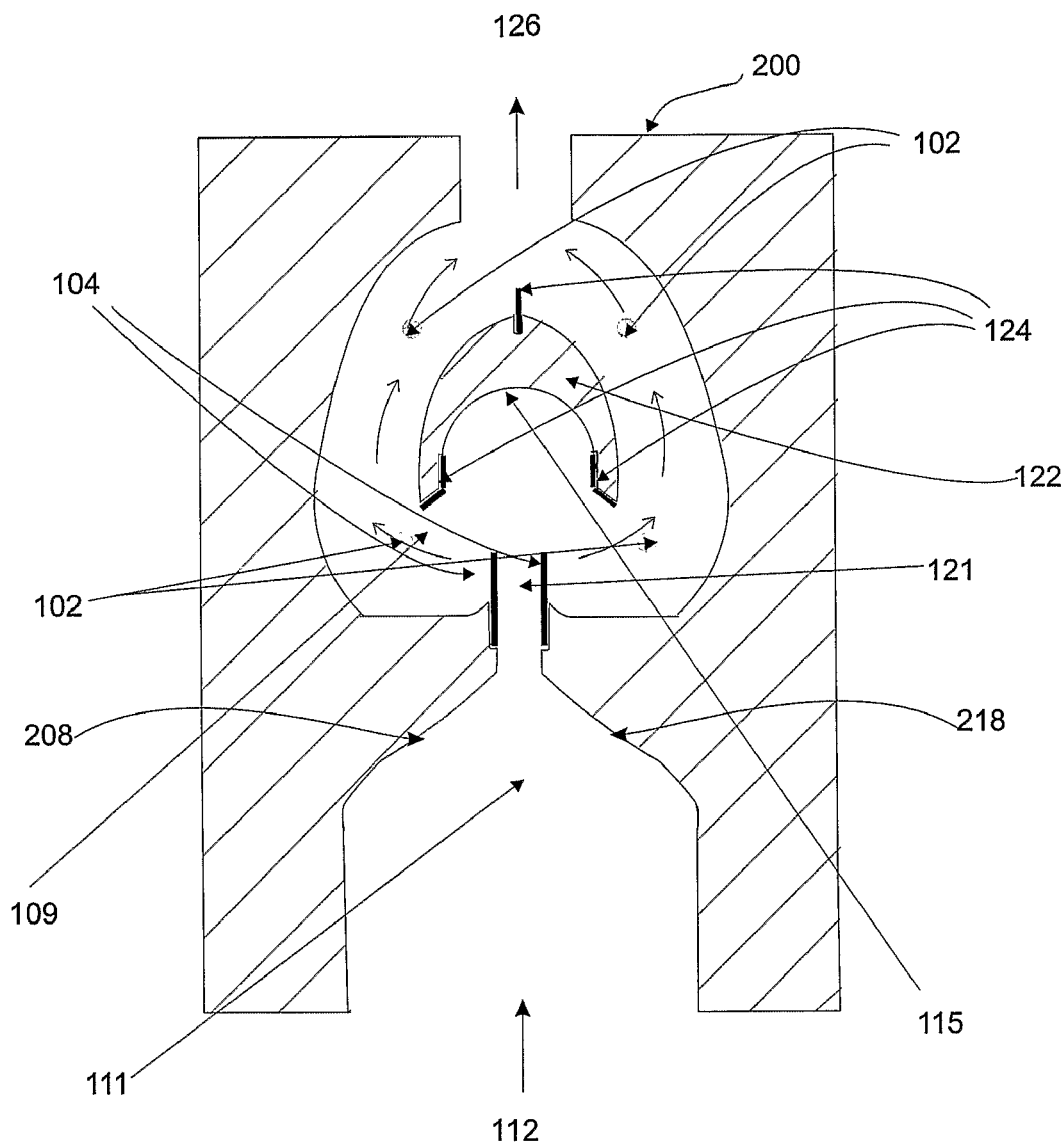
FIG. 2 illustrates another embodiment of the present invention, wherein the flow conditioning means does not have a diverging element.
Figure 2A:
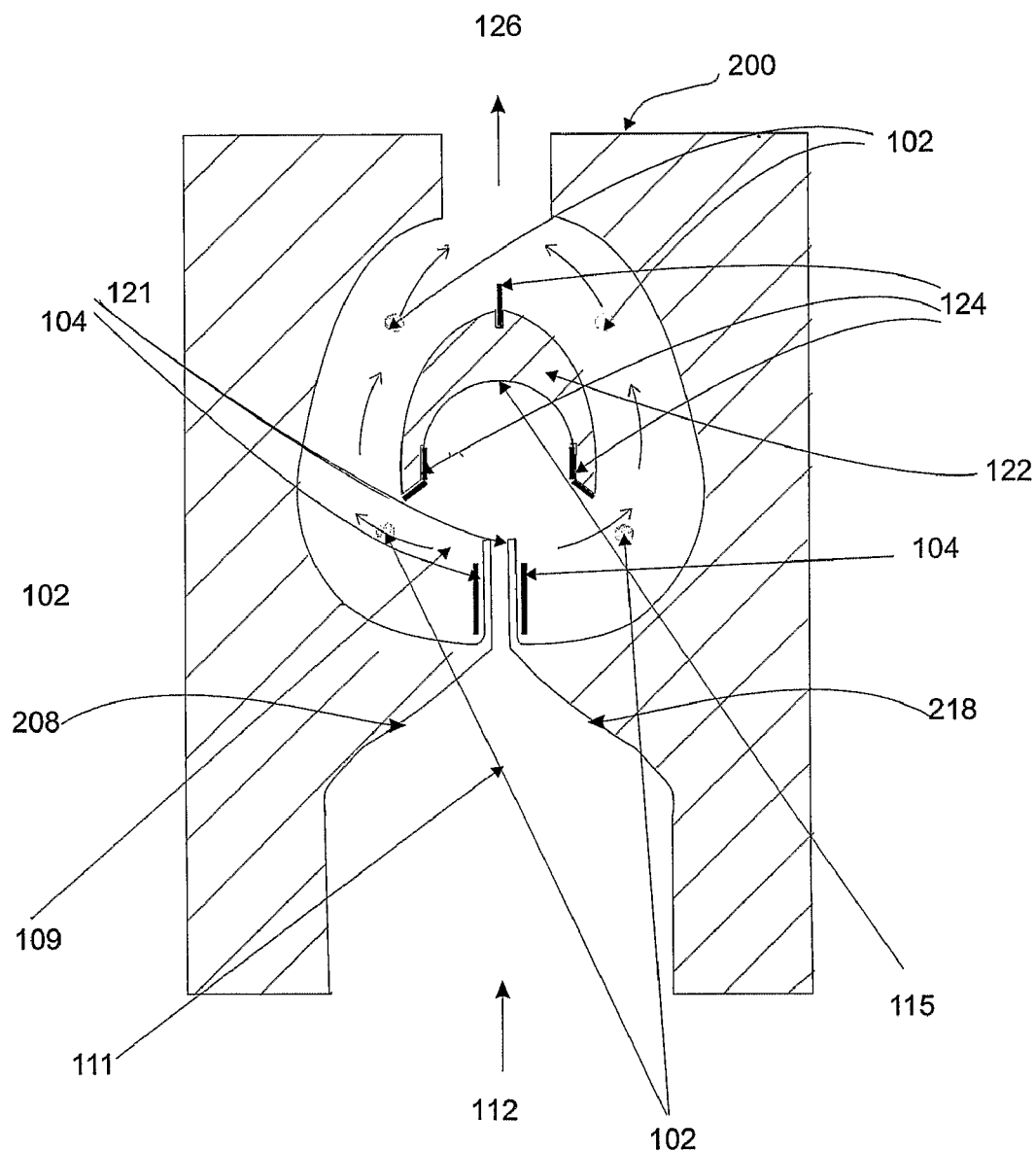
FIG. 2A illustrates yet another embodiment of the present invention shown in FIG. 2.

FIG. 2 illustrates another embodiment of the present invention, wherein the flow conditioning means does not have a diverging element. The meter body is represented by a reference numeral 200. The surfaces of the flow conditioning means 111 are typically indicated by surface 208 and surface 218. The flow conditioning is achieved by the irregularities provided to the surfaces 208 and 218. FIG. 2A illustrates yet another embodiment of the present invention as given in FIG. 2, wherein the bifurcated sensor fins 104 are placed behind the nozzle 121.

Figure 3A:
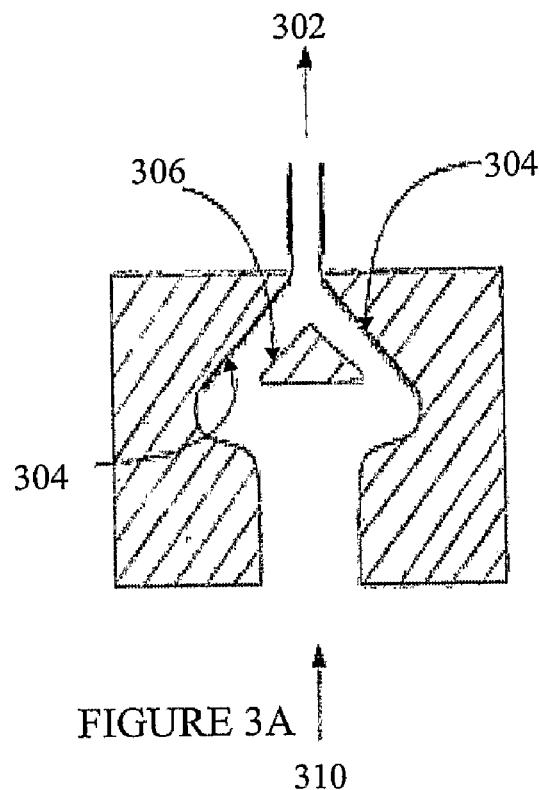
Figure 3B:
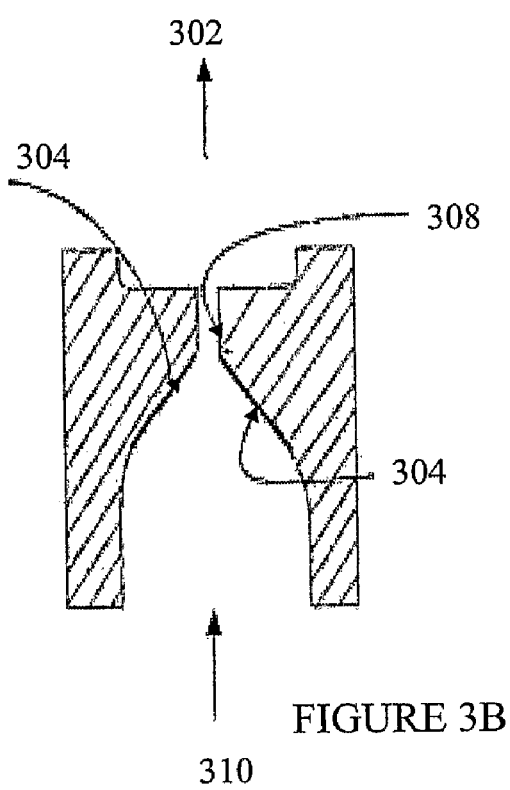
Figure 3C:
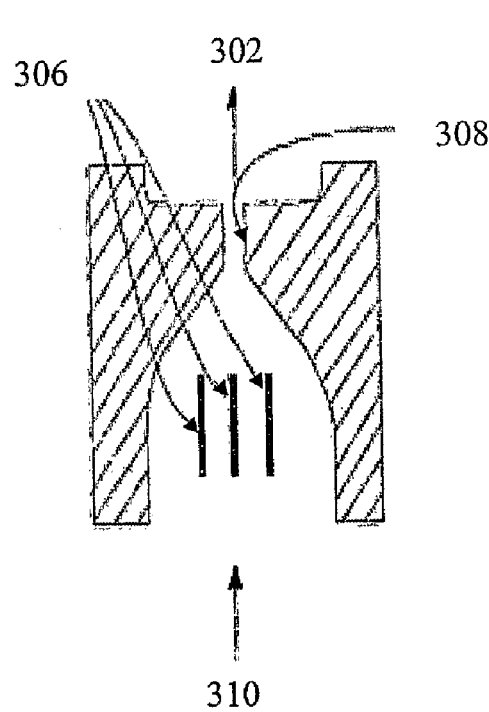
Figure 3D:
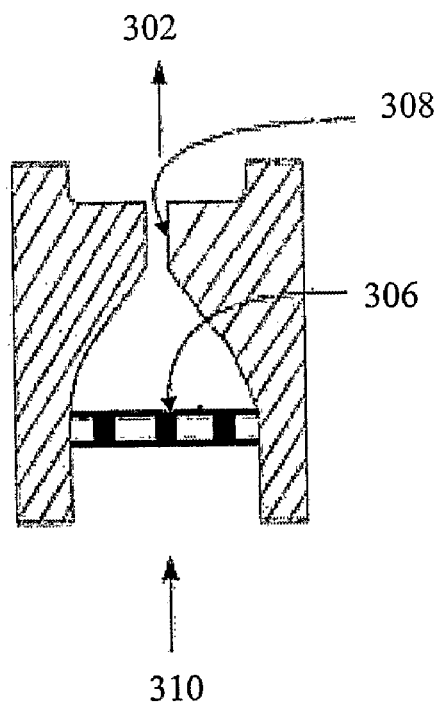

FIG. 3a-3d of the accompanying drawings illustrate different embodiments of the flow conditioner according to the present invention. FIG. 3a illustrates a flow conditioner with a triangular flow diverging element shown by a reference numeral 306 defining 4 surfaces and two channels. The inlet is represented by a reference numeral 310. The irregular surfaces are shown by the reference numeral 304 and the outlet by the reference numeral 302. FIG. 3b of the accompanying drawings illustrates another embodiment of the flow conditioner without a flow diverging element. The nozzle is represented by the reference numeral 308. FIG. 3c shows straightening vanes as the flow diverging element 306. A set of straightening vanes installed in the flow conditioner reduces disturbance before irregular flow reaches the nozzle, thereby smoothening the flow, creating a consistent flow profile, thus increasing the meter accuracy. FIG. 3d shows a perforated plate as the flow diverging element 306. The perforations (holes) in the plate cause the fluid flow to be reconfigured or readjusted in the radial directions so as to develop a preferred fluid flow profile.

FIG. 4 of the accompanying drawings illustrates one embodiment of the bluff body in accordance with this invention. The selection of different shapes and sizes for the bluff body depends on the repeatable frequency of the fluid oscillations. Also, there is a requirement for a clean noise free signal irrespective of the different fluid types passing through the meter.

FIG. 5a of the accompanying drawings illustrates the side view of a sensor assembly with a bifurcated fin. FIG. 5b illustrates the top view of the sensor assembly shown in FIG. 5a. The bifurcated fin 506 of the sensor assembly in FIGS. 5a and 5b can be of rectangular shape or of cylindrical shape. Cylindrical fins are employed where there is a requirement for the least resistance caused by the fins to the fluid flow. Rectangular fins are employed where the flow is parallel to the fin, but the force applied by the flow in the direction perpendicular to the flow is to be measured. The bifurcated fin 506 is employed to create a nozzle in the meter body for forming a jet of the flowing fluid. 502 of FIGS. 5a and 5b represent the wire leads coming out of the sensing segments, 504 of FIGS. 5a and 5b represent the sensing segments and 508 of FIG. 5b represent the partition.

The sensor assembly with bifurcated fin/single fin/cylindrical fin/tapered fin can be formed, molded or cast in one of the body components or in such a way that one sensor is formed, molded or cast in one body component and the other sensor is similarly formed, molded or cast in the other body component. This method of locating/positioning the sensor assembly may be preferred when space is a restrictive criterion.

The sensing segments are selected from a group of sensing segments consisting of piezoelectric sensing segments, piezoresistive sensing segments, capacitive sensing segments, optoelectric sensing segments, stress/strain responsive sensing segments, magnetostrictive sensing segments and pressure sensitive sensing segments. Typically the sensing segments employed in the present invention are piezoelectric sensing segments.

When the force of the oscillating fluid causes the fins to deflect, the displacement of the fins is transferred to the sensing segments as a result of which opposite charges are induced in the sensing segments. Alternate flow of fluid through the upstream paths deflects the sensor fins differently. These deflections are sensed by the sensing segments which are alternately elongated or shortened causing electrical signals to be generated. These electrical signals are picked up by the leads outside the flow meter to a calibrated metering device, typically a differential amplifier employed in an electronic circuit. By sensing these electrical signals, even very low frequencies can be measured. Thus the measuring range is extended from very low to very high frequency.

The signal frequency corresponds to the fluid oscillation frequency which is proportional to the volume flow of the flowing fluid. The output amplitude of the sensor signal is also proportional to the amplitude of the fluid oscillation signal which is again proportional to the velocity and mass flow rate. Hence, by computing the frequency and amplitude of the output sensor signal, the corresponding mass flow rate is obtained. Typical measurement frequency range of the meters is 0 to 3000 Hz. Since the sensor is rigid without moving parts, high frequency signals in the range of 3000 Hz or more are also detected easily.

FIGS. 6a, 6b, 7a and 7b illustrates the embodiments with multiple sensing segments. FIGS. 6a and 6b shows the implementation of four rectangular strip shaped sensing segments 604. The multiple sensing segments are employed to detect very low frequencies of oscillating fluid flow signals. The outer sensing segments can be connected to varying electrical voltage signal and thus, the sensor fins can be vibrated at a predetermined frequency. The oscillating fluid flow acting on the fin generates an electrical signal which modulates the electrical signal which made the fin to vibrate at the above-mentioned predetermined frequency. This modulated frequency signal is now available as output from the inner sensing segments. This signal is further picked up by the leads to the calibrated metering device employed in the electronic circuit and thus, a very low frequency of the oscillating fluid flow can be measured accurately. FIGS. 7a and 7b shows the implementation of four disc shaped sensing segments 704. The wire leads are represented by a reference numeral 602 in FIGS. 6a and 6b and by a reference numeral 702 in FIGS. 7a and 7b. Similarly, fins are represented by a reference numeral 606 in FIG. 6a and by a reference numeral 706 in FIG. 7a.

FIG. 8a illustrates the sensor assembly employed in a noise free environment. The sensing segments are represented by a reference numeral 804, the wire leads coming out of the sensing segments are represented by a reference numeral 802 and the fin is represented by a reference numeral 806. FIG. 8b illustrates the sensor assembly employed in a noisy environment. The noise is cancelled by the introduction of a weight 808. The weight 808 compensates for the vibration of the fin 806 caused by the external noise in the environment by vibrating in such a way so as to nullify the effect of vibration of the fin 806. The placement and shape of the weight depend on the geometry and space and the method of casting or bonding of the sensor assembly.

FIGS. 9 and 10 are different embodiments of the sensor assembly with a weight. The reference numerals 902 of FIG. 9 and 1002 of FIG. 10 represent the wire leads, 904 of FIG. 9 and 1004 of FIG. 10 represent the sensing segments and 906 of FIG. 9 and 1006 of FIG. 10 represent the fins. The weight is represented by reference numerals 908 and 1008 respectively in FIG. 9 and FIG. 10.

In accordance with one more embodiment of the present invention, two units can be arranged as a spirometer so as to measure the inhale and exhale air flow rates of patients.

One or more piezoelectric sensing segments of circular or any shape can be fitted, molded inside, joined adhesively to the body components, or to the bottom face of the fins in the body components.

Advantages of using piezoelectric sensors are as follows:
1. Piezo electric sensors are very robust and they are not damaged by choking or by the tools used for cleaning.
2. Piezo electric sensors have wide operating temperature range viz., −20 degree C. to 300 degree C.
3. Piezo electric sensors have no limitation for operating pressure.
4. Piezo electric sensors have no limitation for material of construction for the flow meter.
5. Piezo electric sensors have no limitation for gas, liquid or steam or conductive/non conductive fluids. Flow rates of oils and emulsions of oil are easily measured.
6. Frequency (output) of piezo electric sensors is directly proportional to the volumetric flow rate irrespective of the fluid parameters.
7. Magnetic materials and burr can pass through the meter.
8. No choking or blocking of ports or passages of the meter takes place.
9. The piezo electric sensor can be molded in the body of the flow meter or can be fitted from outside into the body of the meter.
10. Various materials can be used to make a piezo electric sensor. So compatibility with corrosive fluids is not a problem.
11. External power is not required for the sensor.
12. It is possible in certain sizes of meter, to utilize the electric charge generated in the sensor for charging a small capacitor or a battery which can advantageously be used in battery powered meters.
13. Piezo electric sensors have very low cost compared to the magnet and the thermal sensors.
14. Piezo electric sensors have large signal to noise ratio.
15. Piezo electric sensors have smaller size and are easily available in various shapes and sizes.

Technical Advancements

The different technical advancements offered by the recirculating type flow meter as envisaged in this invention are given below:

The flow meter measures flow rate of all types of fluids such as gas, oil, water and air and it is independent of the fluid properties.

The flow meter in accordance with this invention is very accurate over a long period of time since piezoelectric sensors are used.

The flow meter in accordance with this invention is economical.

The flow meter in accordance with this invention is simple in construction.

The flow meter in accordance with this invention is very robust.

The invention claimed is:

1. A recirculation type hydrodynamic oscillator flow meter for measuring the flow of fluids such as gas, air, water and oil, flowing through a conduit, said flow meter comprising:
   a meter body having a passage for the flow of the fluid, said passage having an inlet and an outlet;
   a nozzle provided in the passage spaced apart from the inlet;
   optionally a flow conditioner provided between the inlet of the passage and the inlet of the nozzle;
   a sensing chamber formed in the body between the outlet of the nozzle and the outlet of the passage;
   a bluff body provided within said sensing chamber spaced apart from the outlet of the nozzle;
   an arcuate face provided to the bluff body facing the outlet of the nozzle, said arcuate face adapted to cause recirculation and diversion to the flow of fluid impinging on the arcuate face, on either side of the bluff body alternately; and
   at least one sensor assembly comprising a sensor body having at least two sensing segments, leads extending from said sensing segments to a metering device located outside said meter body and at least one sensor fin extending from said segments into said passage.

2. A flow meter as claimed in claim (1), wherein said flow conditioning means is provided with a machined rough surface, with uniform machined irregularities or is molded with irregularities.

3. A flow meter as claimed in claim (2), wherein said irregularities provided to said flow conditioning means are in the form of uniform rough surfaces or surfaces with vertical notches or in the form of dimpled golf ball patterns.

4. A flow meter as claimed in claim (1), wherein said sensing segments are selected from a group consisting of sensing segments including piezoelectric sensing segments, piezoresistive sensing segments, capacitive sensing segments, optoelectric sensing segments, stress/strain responsive sensing segments, magnetostrictive sensing segments and pressure sensitive sensing segments.

5. A flow meter as claimed in claim (1), wherein said sensing segments are round, disc shaped or in the form of rectangular strips.

6. A flow meter as claimed in claim (1), wherein said sensor fins are selected from a group consisting of single fins, bifurcated fins, cylindrical fins, rectangular fins, tapered fins and a combination thereof.

7. A flow meter as claimed in claim (1), wherein said sensor fins are fitted between the inlet of said passage and the inlet of said sensing chamber.

8. A flow meter as claimed in claim (1), wherein said sensor fins are fitted inside said sensing chamber.

9. A flow meter as claimed in claim (1), wherein said sensor fins are fitted at the ends of said bluff body and between said bluff body and the outlet of said passage.

10. A flow meter as claimed in claim (1), wherein said sensor assembly has noise cancellation arrangement.

* * * * *